United States Patent [19]

Shiga et al.

[11] Patent Number: 4,955,683
[45] Date of Patent: Sep. 11, 1990

[54] APPARATUS AND A METHOD FOR COUPLING AN OPTICALLY OPERATIVE DEVICE WITH AN OPTICAL FIBER

[75] Inventors: Nobuo Shiga; Takeshi Sekiguchi; Keigo Aga, all of Kanagawa, Japan

[73] Assignee: Sumitomo Electric Industries, Ltd., Osaka, Japan

[21] Appl. No.: 339,799

[22] Filed: Apr. 18, 1989

[30] Foreign Application Priority Data

Apr. 22, 1988 [JP] Japan ................................ 63-100927
Apr. 22, 1988 [JP] Japan ................................ 63-100928

[51] Int. Cl.$^5$ .................................................. G02B 6/36
[52] U.S. Cl. ............................ 350/96.20; 350/96.15; 357/19; 357/30; 250/552
[58] Field of Search ............... 350/96.18, 96.15, 96.17, 350/96.20; 250/227, 552; 357/17, 19, 30, 74, 80

[56] References Cited

U.S. PATENT DOCUMENTS 4,722,586  2/1988  Dodson et al. ................. 350/96.20
4,729,623  3/1988  Mery ................................ 350/96.20

FOREIGN PATENT DOCUMENTS 2503458  10/1982  France ........................... 350/96.17
53-128991  11/1978  Japan ............................ 350/96.17
61-73206  4/1986  Japan ............................. 350/96.20
61-173205  4/1986  Japan ............................ 350/96.20

Primary Examiner—William L. Sikes
Assistant Examiner—Phan T. Heartney
Attorney, Agent, or Firm—Beveridge, DeGrandi & Weilacher

[57] ABSTRACT

This invention relates to an optical module for coupling an optically operative device with an optical fiber. Near the optically operative device, the module includes a fiber saddle on which the optical fiber is affixed by soldering to optically connect the operative device and the fiber. The fiber saddle is provided on a heat insulative substrate, which also mounts the optically operative device, so that heat for melting the solder will not be conducted through the fiber saddle when the optical fiber is soldered to the saddle. Thus, the temperature necessary for soldering can be attained rapidly. A mounting surface of the fiber saddle is plated with solder. A pre-formed solder structure is bridged over the optical fiber after it is positioned on the fixation surface. The pre-formed structure is melted and then allowed to solidify whereby the optical fiber is affixed to the fiber saddle to prevent dislocation of the fiber. The optically operative device is kept free of contamination by flux during soldering of the optical fiber.

19 Claims, 3 Drawing Sheets

FIG. I

APPARATUS AND A METHOD FOR COUPLING AN OPTICALLY OPERATIVE DEVICE WITH AN OPTICAL FIBER

BACKGROUND OF THE INVENTION

1. Field of the Invention

The present invention relates to an optical module for use in optical communication systems, such as data links, optical local area networks (LANs), etc , which use light as an information transmitting medium.

2. Related Background Art

There has been known an optical module comprising an optically operative device, such as semiconductor lasers, pin-photodiodes and others, and optical fibers optically connected to each other in a metal package.

In such an optical module, the end of an optical fiber inserted in the metal package is soldered to a fiber saddle in the package, and the fiber saddle is molded in one piece with the package. A problem with such known structures is that when a change is made to the shape or location of the fiber saddle, a new mold including that of the package has to be prepared, and consequently, such structure cannot be adjusted to changes.

Another problem is that since the fiber saddle and the package are made of metal and made in one piece, the package acts as a heat sink when the end of the optical fiber is soldered to the fiber saddle. This is disadvantageous because it takes much energy and time to melt a solder on the fiber saddle. Consequently the workability is poor.

Further, another problem is that when the soldering is performed, soldering flux evaporates and attaches to the light emitting portion or receiving portion, smearing the same. Also, part of the solder which has not melted due to insufficient heating can touch the end of the optical fiber and dislocate it from its correct position such that the end of the optical fiber is fixed in an incorrect position.

SUMMARY OF THE INVENTION

A first object of the present invention is to provide an optical module having a large tolerance for changes in shapes and locations of a fiber saddle for an optical fiber thereto be soldered to.

A second object of the present invention is to provide an optical module having a structure which enables an optical fiber to be soldered to a fiber saddle in a short period of time.

Accordingly, the present invention provides an optical module having a fiber saddle secured to a substrate made of highly heat insulative material.

A third object of the present invention is to provide an optical module having an optically operative device which is free of soldering flux contamination.

A fourth object of the present invention is to provide an optical module having an optical fiber secured precisely at a position in which the optical fiber has been positioned with respect to an optically operative device.

Accordingly the present invention provides an optical module in which a fixation surface of a fiber saddle to which an optical fiber is to be secured, is plated with solder, a pre-formed structure made of solder is bridged over the optical fiber positioned on the fixation surface, and the pre-formed structure is melted and then allowed to solidify, whereby the optical fiber is secured to the fiber saddle.

The present invention will be more fully understood from the following detailed description and the accompanying drawings which are provided by way of illustration only, and thus are not to be considered as limiting the scope of the present invention.

Further scope of the present invention will become apparent from the following detailed description. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings

FIGS. 4 and 6 are front views of modified pre-formed structures according to alternative embodiments of the present invention.

DESCRIPTION OF THE PREFERRED EMBODIMENTS

Figure 1:
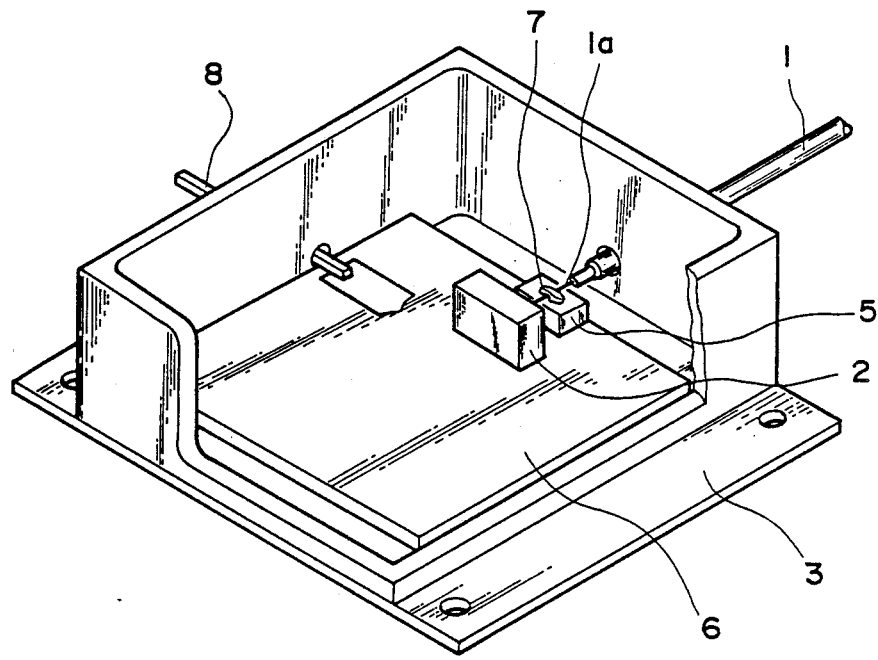
FIG. 1, is a perspective view of a major part of the optical module according to one embodiment of the present invention.

In an optical receiving module according to one embodiment of the present invention, as shown in FIG. 1, in a metal package 3 there is provided a hybrid integrated circuit (IC) or board 6 having a required circuit not shown. Openings are formed in the side walls of the package 3. Through the openings an electric signal line 8 and an optical fiber 1 are inserted in the package 3.

The optical fiber 1 is optically connected to a pin-photodiode (not shown) provided on a side of a carrier chip 2, and light emitted from the end of the optical fiber 1 is incident on the light receiving portion of the which acts as a light receiving device.

The optical fiber 1 has an end 1a made of the so called metallized fiber which comprises exposed glass fiber and a plating applied thereto. The end 1a of the optical fiber 1 is first positioned precisely on a fiber saddle 5 disposed near the carrier chip 2 and then soldered to the fiber saddle 5.

The hybrid IC substrate 6 is made of a heat insulative material, e.g., ceramics or other materials. The carrier chip 2 is mounted on the substrate or board 6 as one element of the circuit. The fiber saddle 5 is made of metal or ceramics vacuum evaporated with metal and is beforehand plated with a solder. The fiber saddle 5 is die bonded to the substrate 6 with a solder having a relatively high melting point, e.g., gold and tin (Au-Sn) solder having a melting point of 280° C.

After a cream solder is applied around the fiber saddle 5, the fiber saddle 5 is mounted on the substrate 6 and then heated. It is possible that the plating and die bonding of the fiber saddle 5 are performed simultaneously.

Figure 2:
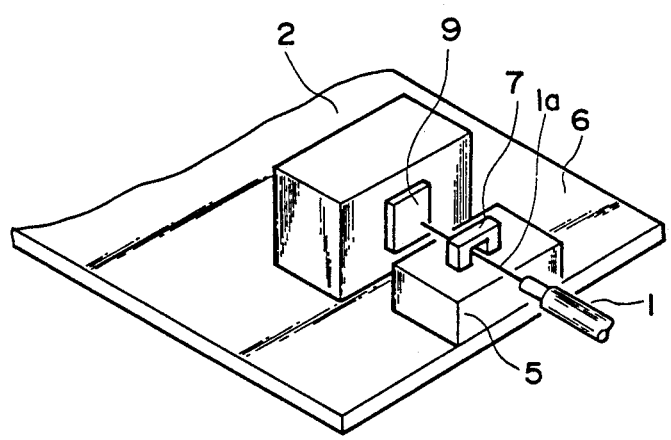
FIG. 2 is a partial perspective view of the embodiment of FIG. 1 for use in explaining fixation of an optical fiber.
Figure 3:
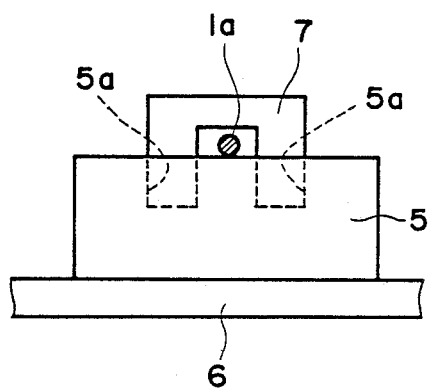
FIG. 3 is a front view of the embodiment of FIG. 1.

Next, the affixation of the end 1a of the optical fiber 1 to the fiber saddle 5 will be explained with reference to FIGS. 2 and 3.

The end 1a of the optical fiber 1 is positioned so as to be optically connected to the pin-photodiode 9 on the front side wall of the carrier chip 2. Cavities 5a are formed on the top of the fiber saddle 5. In the cavities 5a are inserted the legs of a pre-formed structure 7 bridged over the end 1a of the optical fiber 1 positioned on the top of the fiber saddle 5. The preformed structure 7 is made of a solder containing no flux and is shaped as a square bracket. It is preferable that the solder of the pre-formed structure 7 have a lower melting point than that used to die bond the fiber saddle 5. The end Ia of the optical fiber 1 is plated beforehand into a metallized fiber so as to be convenient for soldering.

The pre-formed structure 7 and the fiber saddle 5 as arranged in the above described manner are heated. When the heating temperature exceeds the melting point of the pre-formed structure 7, the pre-formed structure 7 melts. Then the heating is stopped. The melted preformed structure 7 cools and solidifies, and the end 1a of the optical fiber 1 is fixed to the fiber saddle 5.

The end 1a of the optical fiber 1 may be positioned on top of the fiber saddle 5 after the legs of the pre-formed structure 7 are inserted into cavities 5a. Then, the end 1a of the optical fiber 1 is disposed in the gap between the pre-formed structure 7 and the fiber saddle 5.

Figure 4:
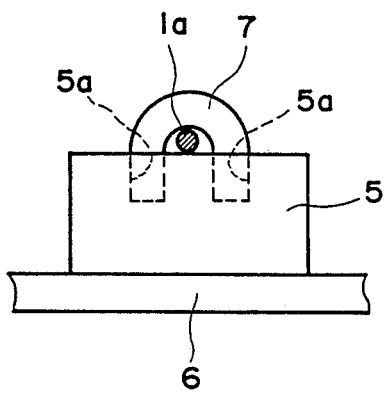
Figure 5:
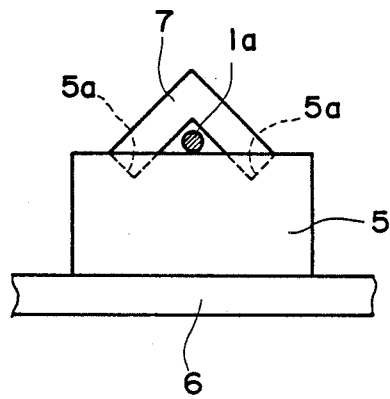

In this embodiment, the pre-formed structure 7 has a square bracket shape before melting. Alternatively, it may have a U-shape or an L-shape as shown in FIGS. 4 and 5.

Finally, a top cover (not shown) is attached to the package for close sealing, and the optical module is completed.

In this embodiment, two legs of the pre-formed structure 7 are inserted into cavities 5a respectively. Alternatively, the pre-formed structure may have a J-shape in which the two legs have different lengths, and only one of the two legs is inserted in the cavity 5a. In this case, there may be only one cavity 5a. And the fiber saddle may not have cavities. In this case the pre-formed structure can be placed on the fixation surface to be bridged over the optical fiber positioned on the fixation surface.

This embodiment is a receiving optical module comprising a pin-photodiode serving as a light receiving device, and an optical fiber optically connected to the light receiving device. However, the optical module according to this invention can be configured as a transmitting optical module by replacing the light receiving device with a light emitting diode or a laser diode serving as a light emitting device.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

We claim:

1. An apparatus for coupling an optically operative device with an optical fiber, said apparatus comprising:
    a ceramic board;
    a saddle affixed on the surface of said ceramic board for supporting an optical fiber thereon;
    an optically operative device mounted on said ceramic board on which said saddle is mounted; and
    a metal package for housing said ceramic board.

2. An apparatus according to claim 1, wherein said optically operative device comprises a light receiving device.

3. An apparatus according to claim 1, wherein said optically operative device comprises a light emitting device.

4. An apparatus according to claim 1, wherein said saddle is formed of a ceramic material and the surfaces of said saddle are metallized by evaporated metal.

5. An apparatus according to claim 1, wherein said saddle has a cavity therein and wherein said apparatus further comprises a bridge-shaped solder structure having a leg adapted for insertion into said cavity.

6. A method of fabricating a device for coupling an optically operative device with an optical fiber, said method comprising the steps of:
    affixing a saddle and an optically operative device on a single ceramic board;
    disposing said ceramic board in a metal package;
    inserting a leading edge of an optical fiber through an opening provided in said metal package into said metal package;
    positioning said optical fiber on said saddle in optical connection with said optically operative device; and,
    affixing said optical fiber on said saddle by soldering.

7. A method according to claim 6, wherein optically a light receiving device is provided as said operative device.

8. A method according to claim 6, wherein a light emitting device is provided as said optically operative device.

9. A method according to claim 6, wherein saddle is formed of a ceramic material and the surfaces of said saddle are metallized by evaporated metal.

10. A method of fabricating a device for coupling an optically operative device with an optical fiber, said method comprising the steps of:
    affixing a saddle and an optically operative device on a single ceramic board;
    disposing said ceramic board in a metal package;
    inserting a leading edge of an optical fiber through an opening provided in said metal package into said metal package;
    placing a solder block having a bridge-like shape on said saddle so that said solder block bridges over said optical fiber; and,
    positioning said optical fiber into optical connection with said optically operative device and melting said solder block to affix said optical fiber on said saddle.

11. A method according to claim 10, wherein a light receiving device is provided as said optically operative device.

12. A method according to claim 10, wherein a light emitting device is provided as said optically operative device.

13. A method according to claim 10, wherein said solder block does not contain flux.

14. A method according to claim 10, wherein said saddle has at least one cavity therein, said method further comprising a step of inserting a part of said solder block into said cavity.

15. A method of fabricating a device for coupling an optically operative device with an optical fiber, said method comprising the steps of:
    affixing a saddle and an optically operative device on a single ceramic board;
    disposing said ceramic board in a metal package,
    placing a solder block having a bridge-like shape on said saddle, inserting a leading edge of an optical fiber through an opening provided in said metal package into said metal package so that said solder block bridges over said optical fiber; and, positioning said optical fiber in optical connection with said optically operative device and thereafter melting said solder block to affix said optical fiber on said saddle.

16. A method according to claim 15, wherein a light receiving device is provided as said optically operative device.

17. A method according to claim 15, wherein a light emitting device is provided as said optically operative device.

18. A method according to claim 15, wherein said solder block does not contain flux.

19. A method according to claim 15, wherein said saddle has at least one cavity therein, said method further comprising a step of inserting a part of said solder block into said cavity.

* * * * *